United States Patent
Chen et al.

(10) Patent No.: US 6,859,305 B2
(45) Date of Patent: Feb. 22, 2005

(54) PRISM-NONLINEAR OPTICAL CRYSTAL COUPLER FOR LASER FREQUENCY CONVERSION

(75) Inventors: Chuangtian Chen, Beijing (CN); Zuyan Xu, Beijing (CN); Junhua Lu, Beijing (CN); Guiling Wang, Beijing (CN)

(73) Assignee: Technical Institute of Physics and Chemistry, Beijing (CN)

( * ) Notice: Subject to any disclaimer, the term of this patent is extended or adjusted under 35 U.S.C. 154(b) by 224 days.

(21) Appl. No.: 10/125,024

(22) Filed: Apr. 18, 2002

(65) Prior Publication Data

US 2002/0154384 A1 Oct. 24, 2002

(30) Foreign Application Priority Data

Apr. 18, 2001 (CN) ........................................ 01115313 A (51) Int. Cl.[7] ................................................ G02F 2/02
(52) U.S. Cl. ........................................ 359/326; 359/328
(58) Field of Search .................................. 359/326–332

(56) References Cited

U.S. PATENT DOCUMENTS

| | | | |
|---|---|---|---|
| 3,675,985 A | * | 7/1972 | Gloge ......................... 359/328 |
| 4,997,244 A | * | 3/1991 | Nishio et al. ................. 359/328 |
| 5,231,533 A | * | 7/1993 | Gonokami et al. ........... 359/328 |
| 5,539,765 A | * | 7/1996 | Sibbett et al. ................. 372/92 |
| 5,640,480 A | * | 6/1997 | Komine ....................... 359/330 |
| 6,064,512 A | * | 5/2000 | Byer et al. ................... 359/326 |
| 6,215,580 B1 | * | 4/2001 | Kouta .......................... 359/328 |
| 2003/0148391 A1 | * | 8/2003 | Salafsky ....................... 435/7.2 |

FOREIGN PATENT DOCUMENTS

EP  436144 A1 * 7/1991 ............. G02F/1/37

OTHER PUBLICATIONS

Dmitriev et al., "Handbook on Nonlinear Optical Crystals", 3rd corr ed. 1999. XVIII, pp. 5–10 (Springer Series in Optical Sciences, vol. 64) Hardcover DM 189.

* cited by examiner

Primary Examiner—Hemang Sanghavi
Assistant Examiner—Scott Alan Knauss
(74) Attorney, Agent, or Firm—Fish & Richardson P.C.

(57) ABSTRACT

The present invention relates to prism-nonlinear optical crystal couplers for frequency conversion, including M pieces of nonlinear optical crystal and one coupling prism stuck to the incident surface or/and exit surface of the crystal by optical stick or a matching liquid. The coupling prisms are the same triangle prisms of right triangle prism, equilateral triangle prism, or inequlateral triangle prism, or are different triangle prisms. It is hopeful to obtain frequency 6th harmonic output.

16 Claims, 6 Drawing Sheets

PRISM-NONLINEAR OPTICAL CRYSTAL COUPLER FOR LASER FREQUENCY CONVERSION

BACKGROUND OF THE INVENTION

1. Field of the Invention

The present invention relates to an optical coupler, especially to a prism-nonlinear optical crystal coupler for laser frequency conversion.

2. Description of Related Art

At present, Laser frequency conversion with nonlinear optical crystal, which includes frequency doubling, sum- and difference-frequency, parameter oscillation and amplification, is achieved as following. At first, the nonlinear optical crystal is cut according to the phase-matching angle. The fundamental laser beam is then incident onto the nonlinear optical crystal at a certain incident angle. Subsequently, the incident angle is adjusted to the phase-matching angle (called angle tuning), or the crystal temperature is controlled the phase-matching temperature, in order to achieve efficient conversion, as described by I. V. G. Dmitriev, G. G. Gurzadyan, D. N. Nikogosyau in "Handbook of nonlinear optical crystals", second revised and updated edition, Spring-verlag, Berlin, Heidelberg, New York, London, Paris, Tokyo, Hong Kong, 1996. The drawback of this method is that some of the nonlinear optical crystals are not easy to be cut, some of them do not have enough size and some of them are too expensive to be cut into certain shapes to meet the requirement of the phase match.

SUMMARY OF THE INVENTION

The objective of the present invention is to properly combine at least one prism and at least one piece of nonlinear optical crystal, which is not easy or unable to be cut along its phase-matching direction, because of being too small or too expensive to construct a low cost prism-nonlinear optical crystal coupler for laser frequency conversion.

The objective of the present invention is achieved as following:

The prism-nonlinear optical crystal coupler of the present invention for laser frequency conversion includes M pieces of nonlinear optical crystal, where, M is an integer greater than or equal to 1. Each nonlinear optical crystal has an incident plane surface and an exit plane surface. There is a coupling prism on the incident or/and the exit surface of the nonlinear optical crystal. The two coupling prisms can be the same triangle prisms of right triangle prism, equilateral triangle prism, or inequilateral triangle prism at the same time, or they can be different prisms of right triangle prism, equilateral triangle prism, and inequilateral triangle prism.

The incident or exit surface of each nonlinear optical crystal and the coupling prism are stuck together with optical stick or a matching liquid. The refractive index of the matching liquid is between the refractive index of the nonlinear optical crystal and that of the coupling prism. The matching liquid can be deionized water of high purity, ethylene glycol, glycerol, methanol, ethyl heptanol, fluorochloro oil or Canada resin. The coupling prism can be made of glass, fused silica, calcium fluoride or other optical material. The incident surface of the prism-nonlinear optical coupler for laser frequency conversion is or is not parallel to the exit surface. The nonlinear optical crystal consists of X pieces of crystals stuck together by a matching liquid.

The principle of the prism-nonlinear optical crystal coupler of the present invention for laser frequency conversion is as following. A prism is stuck to the incident or exit surface with optical stick or a matching liquid; or, two prisms are stuck respectively to the incident and exit surface with optical stick or a matching liquid. The apex angle $\alpha_1$ of the prism (see FIG. 1) here represents the angle between the incident surface and the exit surface of the prism. The angle is designed to be equal to the phase-matching angle of the nonlinear optical crystal used in the present invention. According to the refractive index $n_1$ of the nonlinear optical crystal, $n_2$ of the matching liquid, $n_3$ of the prism material and the prism angle $\alpha_1$, the angle of incidence of the fundamental laser beam can be calculated under the law of refraction. As an example, it can be seen from FIG. 1 that for the nonlinear optical crystal $KBe_2BO_3F_2$ (KBBF), when the prism angle $\alpha_1$ is 45° the frequency conversion from 532 nm to 266 nm can be achieved as long as the fundamental beam is incident on the prism surface at 10.4°. Using the same prism, the frequency conversion from 460 nm to 230 nm can be achieved, as long as the fundamental beam is incident on the prism incident surface at the angle of 90°.

KBBF crystal has many advantages in ultraviolet and deep ultraviolet region. The cut-off wavelength of KBBF is 155 nm. According to the calculation, the shortest second harmonic output wavelength of the crystal is about 165 nm. Now the second harmonic output of 179.4 nm has been obtained. According to the theoretical calculation of the sellmeied equations, it is possible to obtain frequency 6th harmonic output of Nd: YAG laser (the wavelength is 1064 nm) with this crystal. On the other hand, due to the plato-like habit of KBBF crystal, only 1 mm thick wafer (Z axis is perpendicular to wafer surface) can be grown, and can not be cut according to the phase-matching angle. Thus, the phase match can only be achieved by changing the incident angle through rotating the crystal. However, the phase-matching angle of KBBF crystal and the incident angle of fundamental beam increase as the wavelength of fundamental beam moves towards short wavelength. Calculation has shown that when the wavelength of fundamental beam is shorter than 470 nm, the incident angle of fundamental beam should be larger than 90° to meet the requirement of the phase match. So, the second harmonic output of fundamental beam of 470 nm can not be obtained in practice. Fortunately, according to the present invention, the frequency conversion from 3500 nm to 330 nm can be achieved with KBBF crystal.

The advantages of the present invention are as following. If the prism-nonlinear optical crystal coupler of the present invention for is used, not only the second harmonic output wavelength can be shifted down to 165 nm, but also the second harmonic output for various fundamental wavelength can be obtained when the incident angle of fundamental beam is 90°. In addition, crystals, which are not easy to be cut, or can not be cut or are too expensive to be cut, can be combined with prisms to achieve phase match for frequency conversion. In other words, the present invention provides an important way for using the nonlinear optical crystals perfectly. In addition, the cost of the device could be greatly reduced because the nonlinear optical crystal in the device is not necessary to be cut at phase-matching angle.

The present invention will be further described with reference to the drawings and the embodiments.

Caption of the Figures
Input coupling prism 1, 11, 12
Matching liquid 2
Nonlinear optical crystal 3, 31, 32
Output coupling prism 4, 41, 42
Normal direction N
Z axis of nonlinear optical crystal Z
Incident angle of laser beam α
Exit angle of second harmonic beam β
Apex angle of input coupling prism $\alpha_1$
Apex angle of output coupling prism $\alpha_2$
Incident fundamental wavelength $\lambda_1$
Exit frequency-doubled wavelength $\lambda_2$

DETAILED DESCRIPTION OF THE PREFERRED EMBODIMENT

Embodiment 1

Figure 1:
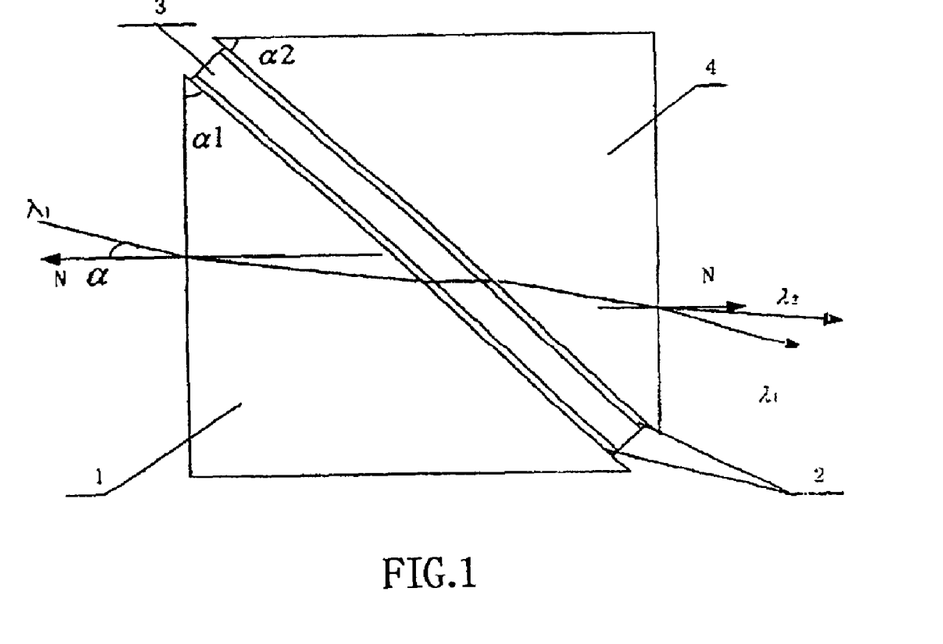
FIG. 1 is a structural schematic view of a prism-nonlinear optical crystal coupler of the present invention for laser frequency conversion.

The prism-nonlinear optical crystal coupler for frequency conversion shown in FIG. 1 is fabricated by the following way. An input coupling prism 1 is stuck to the incident surface of a nonlinear optical crystal (KBBF) 3 with matching liquid 2, while an output coupling prism 4 is stuck to the exit surface with matching liquid 2. Thus, an integral prism-nonlinear optical crystal coupler for laser frequency conversion is constructed. As seen in FIG. 1, the nonlinear optical crystal frequency conversion from 532 nm to 266 nm can be achieved at the incident angle of 90°. In FIG. 1, $\alpha_1$ and $\alpha_2$ are the apex angle of the input coupling prism 1 and the output-coupling prism 4, respectively. The wavelength $\lambda_1$ of the incident fundamental beam is 532 nm, while the exit light includes the second harmonic light of 266 nm ($\lambda_2$) and the remaining laser of 532 nm ($\lambda_1$). Both the input coupling prism 1 and the output-coupling prism 4 are made of fused silica, and are right triangle prism of 45°. The matching liquid 2 is deionized water of high purity. The nonlinear optical crystal 3 is a piece of KBBF nonlinear optical crystal of 1 mm×6 mm×6 mm. Since only thin wafer with mm order of magnitude of KBBF nonlinear optical crystal can be grown because of the plato-like habit, KBBF crystal can not be cut along the phase-matching direction. The fabrication of the prism-nonlinear optical crystal coupler for laser frequency conversion in FIG. 1 does not need to cut the crystal, and the second harmonic output can be achieved, as long as the angle between the incident direction and the normal direction of the incident prism surface is 10.4°. In this embodiment, the normal direction of the KBBF crystal surface is indeed the Z axis direction of the crystal.

Embodiment 2

The prism-nonlinear optical crystal coupler in this embodiment is the same as in embodiment 1 except that, instead of matching liquid, optical stick is used between the exit surface of the input coupling prism 1 and the incident surface of the nonlinear optical crystal 3, also between the incident surface of the output coupling prism 4 and the exit surface of the nonlinear optical crystal 3.

Embodiment 3

Figure 2:
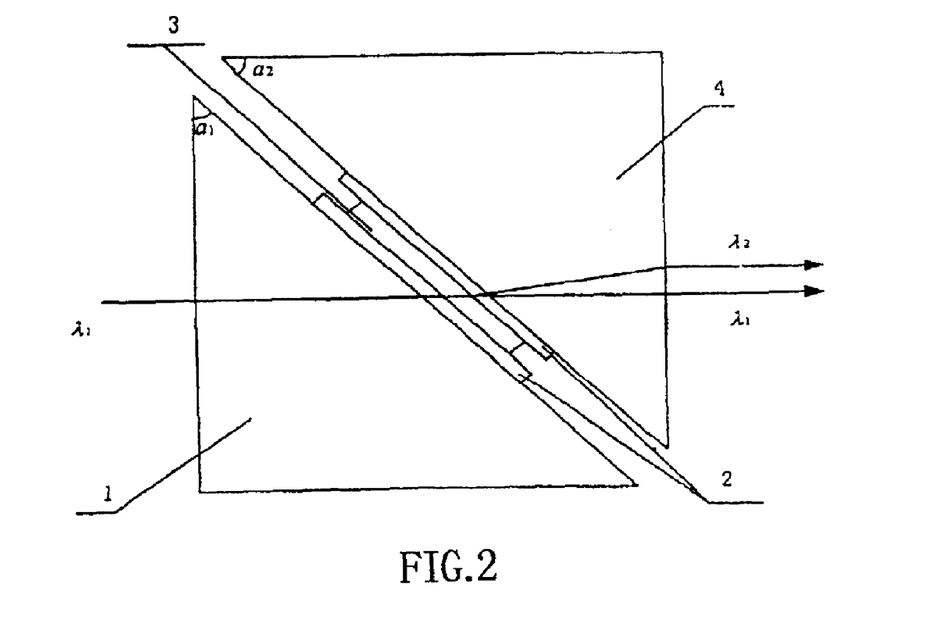
FIG. 2 is a schematic view of the prism-nonlinear optical crystal coupler for laser frequency conversion, as an embodiment of the present invention.
Figure 6:
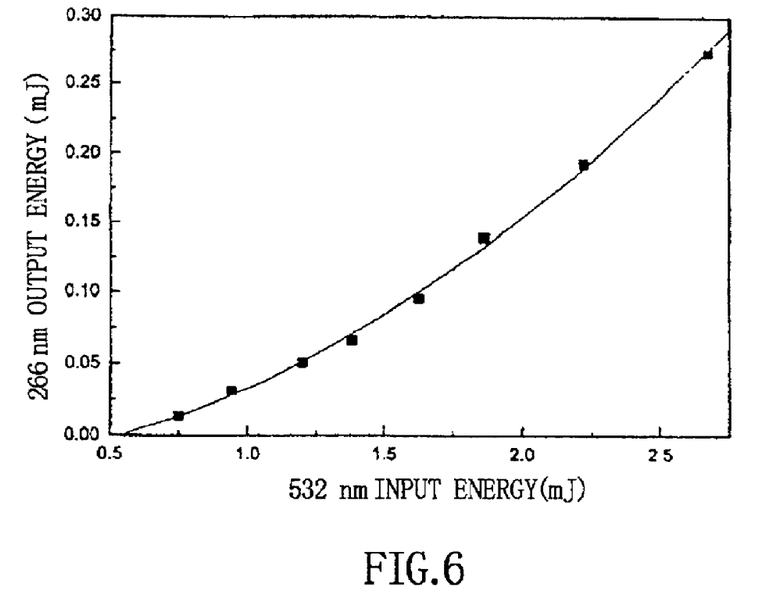
FIG. 6 is a diagram of the output energy of the second harmonic beam of 266 nm with the prism-KBBF nonlinear optical crystal coupler against the input energy of the fundamental beam of 532 nm.
Figure 7:
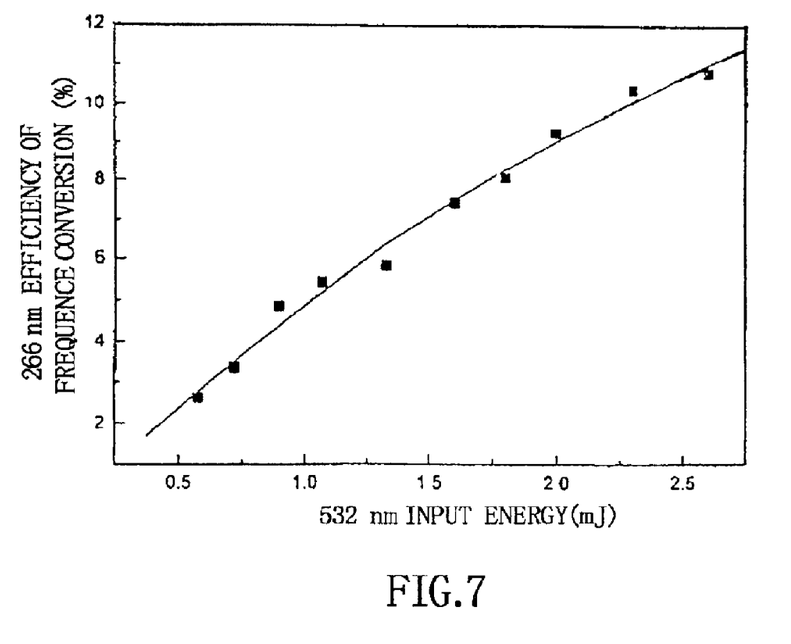
FIG. 7 is a diagram of the efficiency of frequency conversion from 532 nm to 266 nm with the prism-KBBF nonlinear optical crystal coupler against the input energy of the fundamental beam (532 nm)

The prism-nonlinear optical crystal coupler shown in FIG. 2 for laser frequency conversion is fabricated by the following way: An input coupling prism 1 is stuck to the incident surface of the KBBF nonlinear optical crystal 3, while an output coupling prism 4 is stuck to the exit surface, thus an integral prism-nonlinear optical crystal coupler in this embodiment for laser frequency conversion is constructed. As seen in FIG. 2, with KBBF crystal second harmonic output can be obtained by using the prism-nonlinear optical crystal coupler in this embodiment for frequency conversion from 460 nm ($\lambda_1$) to 230 nm ($\lambda_2$). The input coupling prism 1 and the output coupling prism 4 are all right triangle prism of 45° ($\alpha_1$ and $\alpha_2$) and are made of fused silica. The nonlinear optical crystal 3 is a KBBF nonlinear optical crystal of 1 mm×6 mm×6 mm. Since only thin wafer with mm order of magnitude of KBBF nonlinear optical crystal can be grown because of the plato-like habit, KBBF crystal can not be cut according to the phase-matching direction. The frequency conversion from fundamental beam wavelength (460 nm) to second harmonic beam wavelength (230 nm) can be achieved by using the prism-nonlinear optical crystal coupler in this embodiment, as long as the fundamental beam is incident along the normal direction of the incident surface of the input coupling prism 1. The output energy of the second harmonic beam is measured as a function of the incident energy of the fundamental beam (see FIG. 6). The incident fundamental beam is from a Q-switched mode-locked Nd:YAG laser, with the output wavelength of 460 nm and the pulse duration of 25 ps. Under this condition, the second harmonic output efficiency of KBBF crystal can be up to 11% (see FIG. 7).

Embodiment 4

Figure 3:
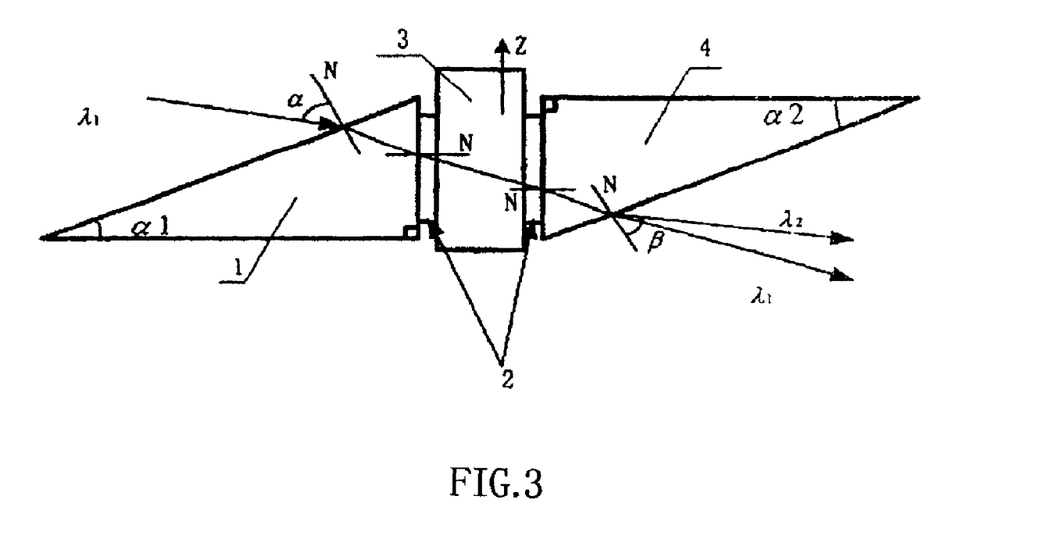
FIG. 3 is a schematic view of the prism-nonlinear optical crystal coupler for laser frequency conversion, as another embodiment of the present invention.

The prism-nonlinear optical crystal coupler shown in FIG. 3 for frequency conversion is fabricated by the following way: An input coupling prism 1 is stuck to the incident surface of the nonlinear optical crystal 3 with the matching liquid 2, while an output-coupling prism 4 is stuck to the exit surface with the matching liquid 2, thus an integral prism-nonlinear optical crystal coupler in this embodiment for laser frequency conversion is constructed. The nonlinear optical crystal 3 is $K_2Al_2B_2O_7$ (KABO). The incident beam of wavelength 532 nm is incident onto the input coupling prism 1 at Brewster angle. The exit light includes the second harmonic light of 266 nm ($\lambda_2$) and the remaining laser of 532 nm ($\lambda_1$). The 266 nm beam also exits from the output-coupling prism 4 at Brewster angle. The input coupling prism 1 and the output-coupling prism 4 are all right triangle prism. One angle $\alpha_1$ of the input coupling prism 1 is 21.3°, while the one $\alpha_2$ of the output-coupling prism 4 is 23°. The input-coupling prism 1 and the output-coupling prism 4 are made of fused silica; the matching liquid 2 is deionized water of high purity. Since large single crystal of KABO can not be grown now, much material will be wasted if the crystal is cut along the phase-matching direction. The advantage of the present invention is that with KABO crystal frequency conversion for various fundamental beam wavelength can be achieved without cutting the crystal. The difference of this embodiment from the embodiment 1 is that in this embodiment one right-angle plane of the input coupling prism 1 contacts to the nonlinear optical crystal 3 and the oblique plane faces upward, while for the output coupling prism 4, the like right-angle plane contacts to the nonlinear optical crystal 3, but the oblique plane faces downward. In this embodiment, the incident angle $\alpha$ is 10.4°, the exit angle $\beta$ is 56.3°.

Embodiment 5

Figure 4:
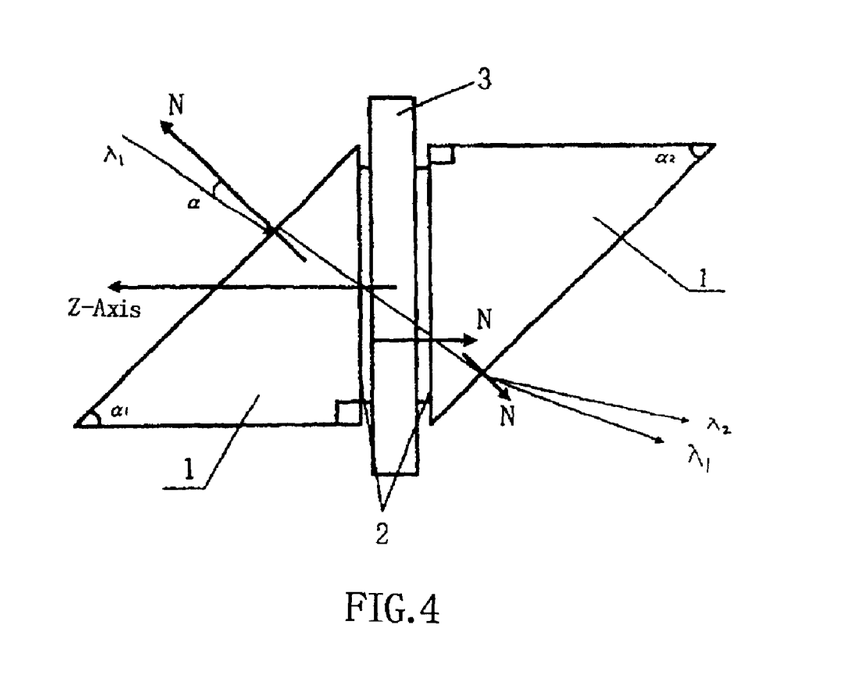
FIG. 4 is a schematic view of the prism-nonlinear optical crystal coupler for laser frequency conversion, as another embodiment of the present invention.

The prism-nonlinear optical crystal coupler shown in FIG. 4 for frequency conversion is fabricated by the following way: A nonlinear optical crystal KBe$_2$BO$_3$F$_2$(KBBF), a right triangle input coupling prism and a right triangle output coupling prism which are made of fused silica are employed. Both angle $\alpha_1$ of the input-coupling prism 1 and the angle $\alpha_2$ of the output-coupling prism 2 are 45°. There is a layer of matching liquid 2 of deionized water of high purity between the input coupling prism 1 and the nonlinear optical crystal 3, and between the nonlinear optical crystal 3 and the output coupling prisms 4 respectively. The nonlinear optical crystal and the coupling prisms are stuck to each other by surface tension of the water between them. The combined prism-nonlinear optical crystal coupler for laser frequency conversion is mounted on an optical holder. An incident beam is incident on the incident surface of the input coupling prism at the incident angle of 10.4° to achieve the frequency conversion from 532 nm ($\lambda_1$) to 266 nm ($\lambda_2$) with KBBF. Since only thin wafer with mm order of magnitude of KBBF nonlinear optical crystal can be grown because of its plato-like habit, it can not be cut according to the phase-matching direction. Fortunately, the frequency conversion from fundamental wavelength (532 nm) to second harmonic wavelength (260 nm) can be achieved by using the prism-nonlinear optical crystal coupler shown in FIG. 4, as long as the fundamental beam is incident along the normal direction of the incident surface of the input coupling prism 1.

Embodiment 6

Figure 5A:
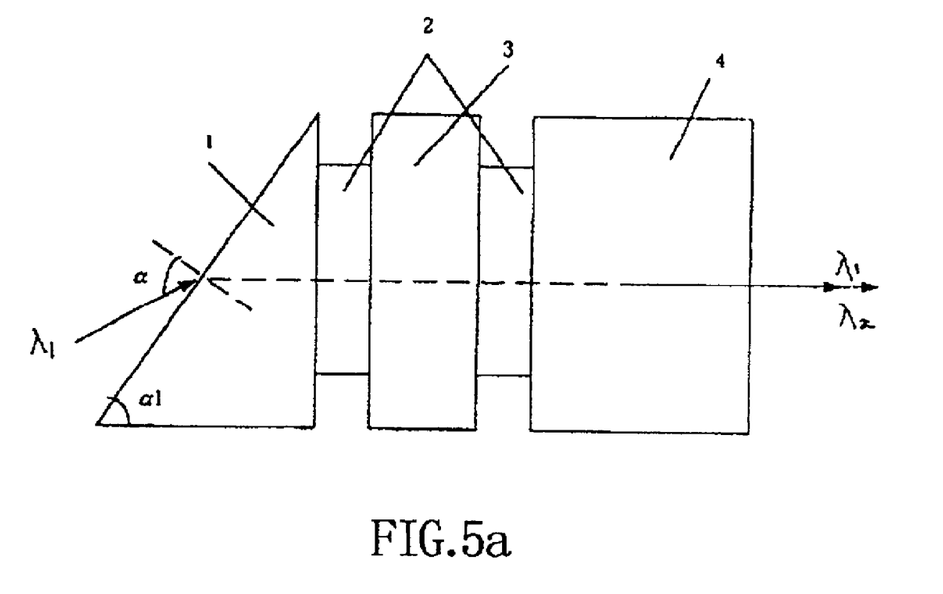
FIGS. 5a and 5b are respectively the top and the side schematic views of the nonlinear optical crystal coupler for laser frequency conversion, as another embodiment of the present invention.
Figure 5B:
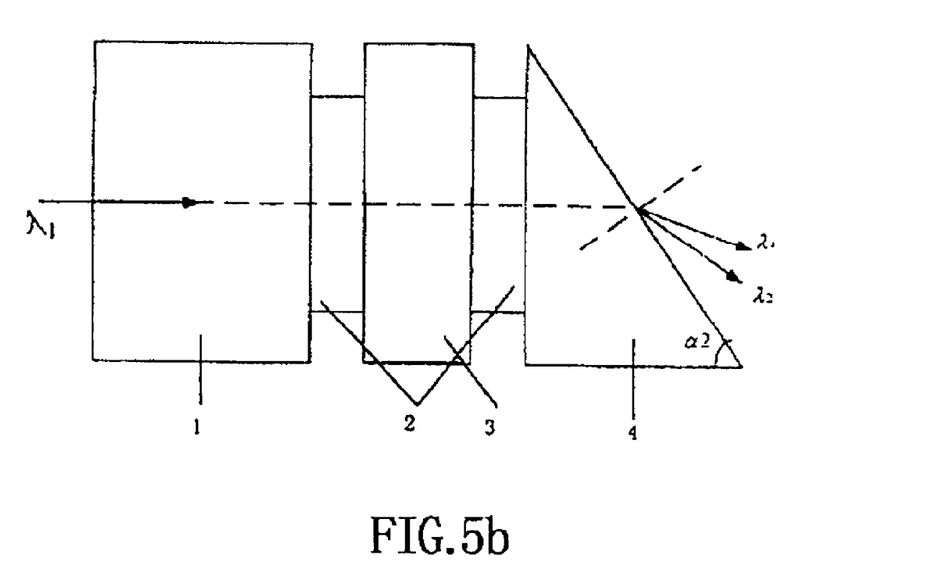

The prism-nonlinear optical crystal coupler shown in FIGS. 5a and 5b for laser frequency conversion is fabricated by the following way: FIGS. 5a and 5b are respectively the top view and the side view of the prism-nonlinear optical crystal coupler in this embodiment for laser frequency conversion. An input coupling prism 1 is stuck to the incident surface of a nonlinear optical crystal 3 with the matching liquid 2, and an output coupling prism 4 is stuck to the exit surface with the matching liquid 2 to construct the prism-nonlinear optical crystal coupler in this embodiment for laser frequency conversion. Both the input coupling prism 1 and the output-coupling prism 4 are right triangle prism. The nonlinear optical crystal 3 is K$_2$Al$_2$B$_2$O$_7$ (KABO) crystal. With the prism-KABO nonlinear optical crystal coupler the second harmonic output can be obtained when the wavelength $\lambda_1$ of the incident beam is 532 nm. The incident beam is horizontally polarized with incident angle $\alpha_1$=55.6°, i.e. Brewster angle, with this incident angle the incident beam does not have Fresnel loss at incident surface. Exit light includes second harmonic light of 266 nm ($\lambda_2$) and the remaining laser of 532 nm ($\lambda_1$). The second harmonic beam of 266 nm exits at the Brewster angle and is vertically polarized. The orientation of the output-coupling prism is adjusted so that the Fresnel loss of 266 nm beam is eliminated. The input coupling prism 1 is a right triangle prism with one apex angle $\alpha_1$ of 55.6°, and the output coupling prism 4 is a right triangle prism with one apex angle $\alpha_2$ of 34.4°. Both the input coupling prism 1 and the output-coupling prism 4 are made of fused silica. Since large single crystal of KABO nonlinear optical crystal can not be grown now, much material will be wasted if it is cut along its phase-matching direction. Fortunately, with KABO crystal second harmonic output for various fundamental wavelength can be obtained by using the above coupler without cutting the crystal. The energy losses at the incident surface and the exit surface are reduced to their minimum, therefore, the conversion efficiency is increased.

The difference of this embodiment from the embodiment 4 is that in this embodiment the oblique plane (i.e. output surface) of the output-coupling prism 4 faces upward.

Embodiment 7

Figure 8:
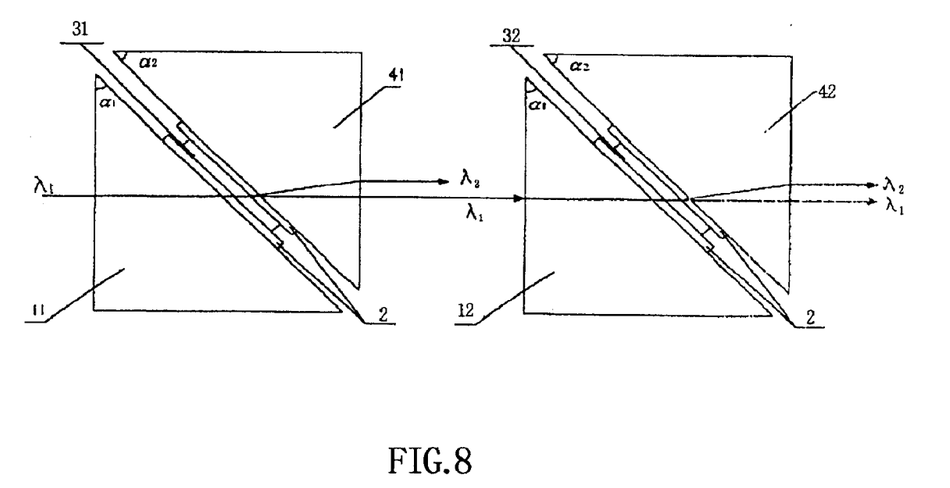
FIG. 8 is a schematic view of the prism-nonlinear optical crystal coupler for laser frequency conversion, as another embodiment of the present invention.

FIG. 8 is a schematic view of the prism-KBBF nonlinear optical crystal coupler in this embodiment for frequency conversion from 460 nm to 230 nm. As shown in FIG. 8, in this embodiment, in fact, two nonlinear optical couplers shown in FIGS. 1 and 2 for laser frequency conversion are used in series, therefore, the conversion efficiency is increased. Here, input coupling prism 11, 12 and output coupling prism 41, 42 are all right triangle prisms with apex angle of 45°, and are made of fused silica. The nonlinear optical crystal 31 and 32 are KBBF crystal of 1 mm×6 mm×6 mm. There is a layer of matching liquid 2 of deionized water with high purity between the exit surface of the input coupling prism 11 and the incident surface of the nonlinear optical crystal 31; between the incident surface of the output coupling prism 41 and the exit surface of the KBBF nonlinear optical crystal 31; between the exit surface of the input coupling prism 12 and the incident surface of the KBBF nonlinear optical crystal 32; also between the incident surface of the output coupling prism 42 and the exit surface of the KBBF nonlinear optical crystal 32. They are stuck to each other by surface tension of deionized water between them. The combined couplers are mounted on their own optical holders, thus, the prism-nonlinear optical crystal couplers used in series for laser frequency conversion are constructed. The frequency-doubling conversion from the fundamental beam wavelength ($\lambda_1$=460 nm) to the frequency-doubled beam wavelength ($\lambda_2$=230 nm) can be achieved by using the device shown in FIG. 8, as long as the fundamental beam is incident along the normal direction of the incident surface of the input coupling prism 1. As deduced from the above, in principle, M pieces of nonlinear optical crystals, M pieces of input coupling prisms and M pieces of output coupling prisms can be combined in proper series to achieve frequency conversion, where, M is an integer greater than or equal to 1. Since large KBBF nonlinear optical crystal can not be grown now, it can not be cut along the phase-matching direction. Fortunately, with KBBF crystal second harmonic output for various fundamental frequency can be obtained by using the above coupler without cutting the crystal.

Embodiment 8

Figure 9:
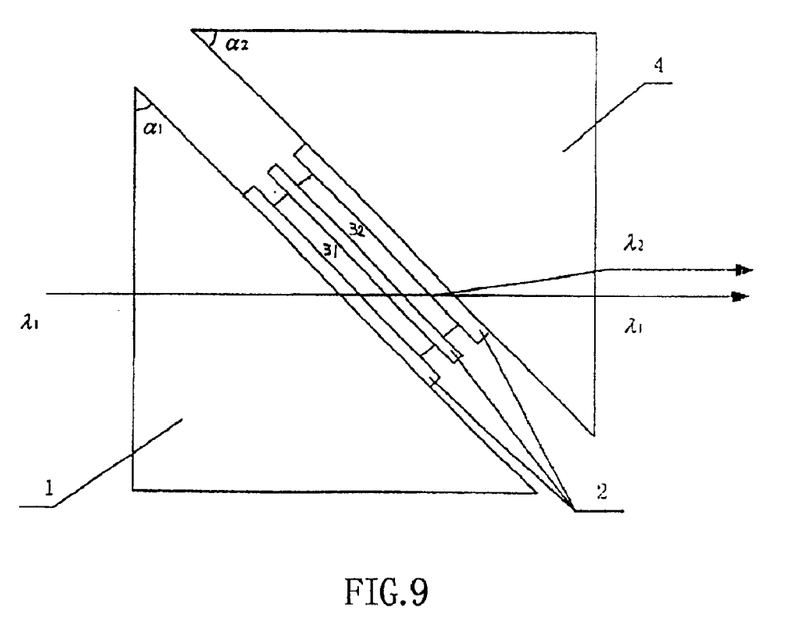
FIG. 9 is a schematic view of the prism-nonlinear optical crystal coupler for laser frequency conversion, as another embodiment of the present invention.
Figure 10:
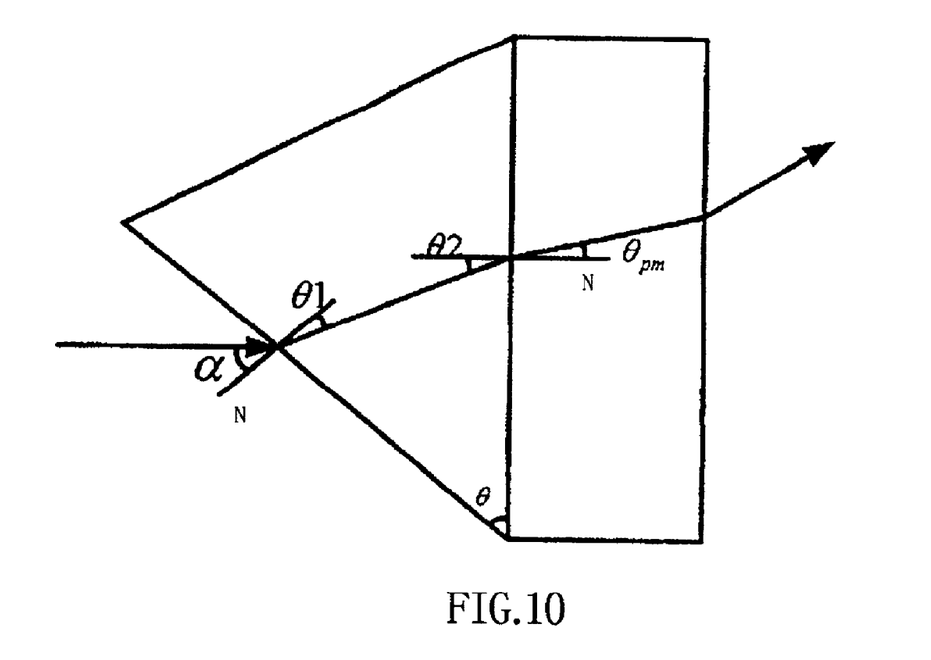
FIG. 10 is a schematic view of the prism-nonlinear optical crystal coupler for laser frequency conversion, as another embodiment of the present invention.

FIG. 9 is a schematic view of a prism-KBBF nonlinear optical crystal coupler for the frequency conversion from $\lambda_1$=460 nm to $\lambda_2$=230 nm. In this embodiment, two nonlinear optical crystals, one input coupling prism and one output-coupling prism are connected into a frequency conversion coupler, and the conversion efficiency of this coupler is increased. Both input coupling prism 1 and the output coupling prism 4 are the right triangle prism with apex angle of 45° ($\alpha_1$ and $\alpha_2$), and made of fused silica. The sizes of the two pieces of KBBF nonlinear optical crystals are 1 mm×6 mm×6 mm. KBBF crystal 31 and 32 are stuck to each other by the surface tension of the matching liquid 2 of high purity deionized water between them. Likely, the exit surface of the input coupling prism 1 and the incident surface of the KBBF crystal 31, the incident surface of the output coupling prism 4 and the exit surface of the KBBF nonlinear optical crystal 32 are stuck to each other by the surface tension of the matching liquid 2 of high purity deionized water between them. The combined coupler is mounted on an optical holder. Thus, a prism-nonlinear optical crystal coupler in this embodiment is fabricated. The frequency conversion from the fundamental wavelength ($\lambda_1$=460 nm) to the second harmonic wavelength ($\lambda_2$=230 nm) can be achieved by using the prism-nonlinear optical crystal coupler shown in FIG. 9, as long as the fundamental beam is incident along the normal direction of the incident surface of the input coupling prism 1 As deduced from above, M pieces of nonlinear optical crystal(s), one input coupling prism and one output coupling prism can be connected together in series to achieve frequency conversion, where M is an integer greater than or equal to 1. Since large KBBF crystal can not be grown now, it can not be cut according to its phase-matching direction. Fortunately, with KBBF crystal second harmonic output can be obtained for various fundamental frequency by using the above coupler without cutting the crystal, and the conversion efficiency is increased.

Embodiment 9

Figure 11:
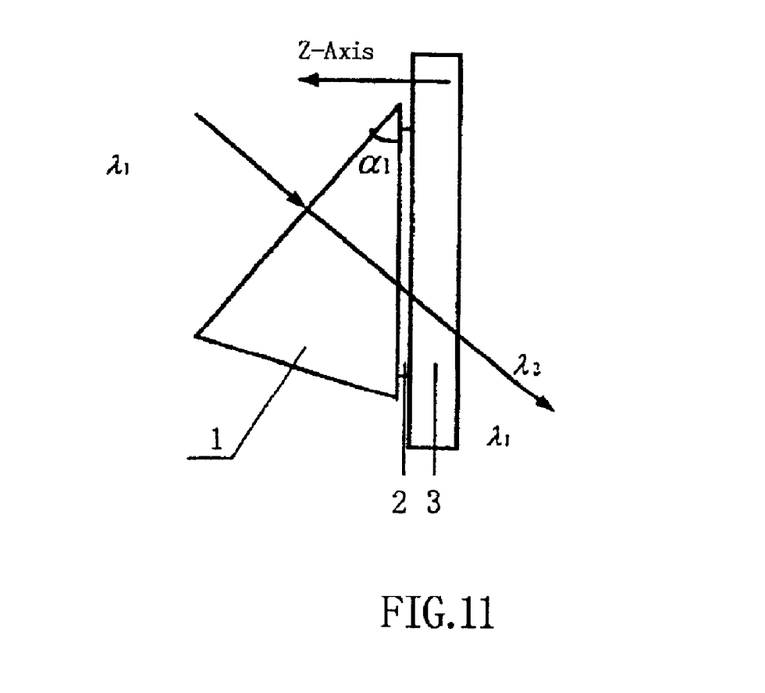
FIG. 11 is a schematic view of the prism-nonlinear optical crystal coupler for laser frequency conversion, as another embodiment of the present invention.

The prism-nonlinear optical crystal coupler shown in FIG. 11 for frequency conversion is fabricated as following: The frequency conversion coupler is fabricated with a KBBF nonlinear optical crystal and a CaF2 input coupling prism. One angle $\alpha_1$ of the input coupling prism 1 is 40.2°, the two other angles can be arbitrary, for an example, 60° and 79.8°. The input coupling prism 1 and the nonlinear optical crystal 3 are stuck together by the matching liquid of fluoro-chloro oil between them, then the combined prism-nonlinear optical crystal coupler for frequency conversion is mounted on an optical holder. The frequency conversion from 532 nm ($\lambda_1$) to 266 nm ($\lambda_2$) can be achieved by using the coupler in this embodiment, as long as the incident beam is incident along the normal direction of the prism. Since large KBBF nonlinear optical crystal can not be grown now, it can not be cut along its phase-matching direction. Fortunately, with KBBF crystal second harmonic output can be obtained for various fundamental frequency by using the above coupler without cutting crystal.

What is claimed is:

1. A prism-nonlinear optical crystal coupler for laser frequency conversion, the prism-nonlinear optical crystal coupler comprising:

a nonlinear optical crystal and a coupling prism, the coupling prism being provided on at least one of an incident surface and an exit surface of the nonlinear optical crystal, an apex angle θ of the coupling prism on the incident surface being determined by the refractive index of the coupling prism and a phase-matching angle of the nonlinear optical crystal; for a given wavelength the apex angle θ being determined by $n_3 \sin \theta_2 = n_1 \sin \theta_{pm}$, $\theta_1 + \theta_2 = \theta$, $\sin \alpha = n_3 \sin \theta_1$, where $_1$ is a refractive index of the crystal at the given wavelength, $n_3$ is a refractive index of the prism at the given wavelength, $\alpha$ is an incident angle of a laser beam at the coupling prism, $\theta_{pm}$ is a phase-matching angle of the nonlinear optical crystal at the given wavelength, $\theta_1$ is a refractive angle of the laser beam into the prism, $\theta_2$ is an incident angle of the laser beam from the prism to the crystal, so that the beam is incident at an incident angle of substantially 0° to satisfy the phase-matching angle in the crystal; a fundamental beam and a second harmonic beam being separated through the coupling prism at the exit surface.

2. The prism-nonlinear optical crystal coupler for laser frequency conversion according to claim 1, wherein the apex angle θ' of the coupling prism at the exit surface is determined by the refractive index of the coupling prism and the phase-matching angle of the nonlinear optical crystal; for a given wavelength the apex angle θ' is determined by the following equations, $n_3 \sin \theta_2' = n_1 \sin \theta_{pm}$, $\theta_1' + \theta_2' = \theta$, $\sin \alpha' = n_3 \sin \theta_1'$, where $n_1$ is the refractive index of the crystal at the given wavelength, $n_3$ is the refractive index of the prism at the given wavelength, $\alpha'$ is the exit angle of the laser beam at the coupling prism, $\theta_{pm}$ is the phase-matching angle of the nonlinear optical crystal at the given wavelength, $\theta_1'$ is the incident angle of the laser beam at the prism, $\theta_2'$ is the refractive angle of the laser beam from the crystal to the prism, so that the beam exits at an angle of substantially 0°.

3. The prism-nonlinear optical crystal coupler for laser frequency conversion according to claim 1, wherein the said coupling prisms are made of a material selected from the group consisting of glass, fused silica, and calcium fluoride.

4. The prism-nonlinear optical crystal coupler for laser frequency conversion according to claim 1, wherein a coupling prism is attached to at least one of the incident surface or/and the exit surface of each said nonlinear optical crystal by optical contact or a matching liquid.

5. The prism-nonlinear optical crystal coupler for laser frequency conversion according to claim 4, wherein the refractive index of the said matching liquid has a value between the refractive index of the nonlinear optical crystal and that of the coupling prism material.

6. The prism-nonlinear optical crystal coupler for laser frequency conversion according to claim 5, wherein the matching liquid is selected from the group consisting of deionized water, ethylene glycol, glycerol, methanol, ethyl heptanol, fluoro-chloro oil and Canada resin.

7. The prism-nonlinear optical crystal coupler for laser frequency conversion according to claim 1, wherein the said nonlinear optical crystal is KBBF crystal, or any other nonlinear optical crystal whose phase-matching angle may be known.

8. The prism-nonlinear optical crystal coupler for laser frequency conversion according to claim 1, wherein the nonlinear optical crystal includes M pieces of nonlinear optical crystals, which are attached together by matching liquid, where M is an integer greater than or equal to 1.

9. A prism-nonlinear optical crystal coupler for laser frequency conversion, the prism-nonlinear optical crystal coupler comprising:

a nonlinear optical crystal and a coupling prism, the coupling prism being provided on at least one of an incident surface and an exit surface of the nonlinear optical crystal, an apex angle θ of the coupling prism on the incident surface being determined by the refractive index of the coupling prism and a phase-matching angle of the nonlinear optical crystal; for a given wavelength the apex angle $\theta$ being determined by $$n_3 \sin \theta_2 = n_1 \sin \theta_{pm},$$

$\theta_1 + \theta_2 = \theta$, $\sin \alpha = n_3 \sin \theta_1$, where $n_1$ is a refractive index of the crystal at the given wavelength, $n_3$ is a refractive index of the prism at the given wavelength, $\alpha$ is an incident angle of a laser beam at the coupling prism, $\theta_{pm}$ is a phase-matching angle of the nonlinear optical crystal at the given wavelength, $\theta_1$ is a refractive angle of the laser beam into the prism, $\theta_2$ is an incident angle of the laser beam from the prism to the crystal, so that the beam is substantially incident at the Brewster angle to satisfy the phase-matching angle in the crystal; a fundamental beam and a second harmonic beam being separated through the coupling prism at the exit surface.

10. The prism-nonlinear optical crystal coupler for laser frequency conversion according to claim 9, wherein the apex angle $\theta'$ of the coupling prism at the exit surface is determined by the refractive index of the coupling prism and the phase-matching angle of the nonlinear optical crystal; for a given wavelength the apex angle $\theta'$ is determined by the following equations, $n_3 \sin \theta_2' = n_1 \sin \theta_{pm}$, $\theta_1' + \theta_2' = \theta$, $\sin \alpha' = n_3 \sin \theta_1'$, where $n_1$ is the refractive index of the crystal at the given wavelength, $n_3$ is the refractive index of the prism at the given wavelength, $\alpha'$ is the exit angle of the laser beam at the coupling prism, $\theta_{pm}$ is the phase-matching angle of the nonlinear optical crystal at the given wavelength, $\theta_1'$ is the incident angle of the laser beam at the prism, $\theta_2'$ is the refractive angle of the laser beam from the crystal to the prism, so that the beam exits at substantially the Brewster angle.

11. The prism-nonlinear optical crystal coupler for laser frequency conversion according to claim 9, wherein the said coupling prisms are made of a material selected from the group consisting of glass, fused silica, and calcium fluoride.

12. The prism-nonlinear optical crystal coupler for laser frequency conversion according to claim 9, wherein a coupling prism is attached to at least one of the incident surface or/and the exit surface of each said nonlinear optical crystal by optical contact or a matching liquid.

13. The prism-nonlinear optical crystal coupler for laser frequency conversion according to claim 12, wherein the refractive index of the said matching liquid has a value between the refractive index of the nonlinear optical crystal and that of the coupling prism material.

14. The prism-nonlinear optical crystal coupler for laser frequency conversion according to claim 13, wherein the matching liquid is selected from the group consisting of deionized water, ethylene glycol, glycerol, methanol, ethyl heptanol, fluoro-chloro oil and Canada resin.

15. The prism-nonlinear optical crystal coupler for laser frequency conversion according to claim 9, wherein the said nonlinear optical crystal is KBBF crystal, or any other nonlinear optical crystal whose phase-matching angle may be known.

16. The prism-nonlinear optical crystal coupler for laser frequency conversion according to claim 9, wherein the nonlinear optical crystal includes M pieces of nonlinear optical crystals, which are attached together by matching liquid, where M is an integer greater than or equal to 1.

* * * * *